(12) United States Patent
Whitcher et al.

(10) Patent No.: US 8,498,996 B2
(45) Date of Patent: Jul. 30, 2013

(54) COMPUTER-IMPLEMENTED METHOD AND SYSTEM FOR HANDLING AND TRANSFORMING DATABASE QUERIES IN A FOURTH GENERATION LANGUAGE

(75) Inventors: Michael Stephen Whitcher, Apex, NC (US); Richard Dean Langston, Cary, NC (US); Howard Plemmons, Jr., Apex, NC (US)

(73) Assignee: SAS Institute Inc., Cary, NC (US)

( * ) Notice: Subject to any disclaimer, the term of this patent is extended or adjusted under 35 U.S.C. 154(b) by 698 days.

(21) Appl. No.: 12/263,760

(22) Filed: Nov. 3, 2008

(65) Prior Publication Data

US 2010/0114932 A1   May 6, 2010

(51) Int. Cl.
G06F 7/00 (2006.01)
G06F 17/30 (2006.01)

(52) U.S. Cl.
USPC .......................................... 707/759; 707/769

(58) Field of Classification Search
USPC ................................................. 707/759, 769
See application file for complete search history.

(56) References Cited

U.S. PATENT DOCUMENTS

| | | | |
|---|---|---|---|
| 5,416,917 A * | 5/1995 | Adair et al. | 707/695 |
| 5,421,008 A | 5/1995 | Banning et al. | |
| 5,590,319 A | 12/1996 | Cohen et al. | |
| 5,659,725 A | 8/1997 | Levy et al. | |
| 5,822,747 A | 10/1998 | Graefe et al. | |
| 6,006,214 A | 12/1999 | Carey et al. | |
| 6,009,428 A * | 12/1999 | Kleewein et al. | 1/1 |
| 6,041,344 A | 3/2000 | Bodamer et al. | |
| 6,912,539 B1 * | 6/2005 | Kapitanski et al. | 707/683 |
| 6,941,298 B2 | 9/2005 | Chow et al. | |
| 7,447,686 B2 | 11/2008 | Levine | |
| 2004/0103100 A1 * | 5/2004 | Levine | 707/100 |
| 2004/0128276 A1 * | 7/2004 | Scanlon et al. | 707/1 |
| 2005/0010569 A1 | 1/2005 | Styles | |
| 2006/0235839 A1 * | 10/2006 | Krishnaprasad et al. | 707/4 |
| 2007/0027905 A1 * | 2/2007 | Warren et al. | 707/103 R |
| 2007/0073675 A1 * | 3/2007 | Kaar et al. | 707/4 |
| 2007/0239669 A1 | 10/2007 | Ordonez et al. | |

OTHER PUBLICATIONS

Marek Rusinkiewicz, "Query transformation in a multi-database environment using a universal symbolic manipulation system", ACM, 1989.*
Betit, Jacob F., Feb. 10, 2006 Office Action from U.S. Appl. No. 10/303,106 (21 pages).
Betit, Jacob F., Aug. 10, 2006 Office Action from U.S. Appl. No. 10/303,106 (21 pages).
Betit, Jacob F., Jul. 13, 2007 Final Office Action from U.S. Appl. No. 10/303,106 (21 pages).

* cited by examiner

*Primary Examiner* — Shew-Fen Lin
(74) *Attorney, Agent, or Firm* — Kilpatrick Townsend & Stockton LLP

(57) ABSTRACT

A computer-implemented method and system allows generating a query and a first fourth generation language at a native system to a non-native database which is capable of processing queries in a second fourth generation language. A query initiated by a client applicant in a first fourth generation language is analyzed to determine if it can be processed by a non-native system capable of processing queries in a second fourth generation language. Non-standard syntax representative of a function and the query that cannot be evaluated by the non-native database system is identified. If the syntax is discovered, the query is transformed through the use of formats or through an algorithm process into an equivalent query expression that can be processed by the database system.

54 Claims, 11 Drawing Sheets

COMPUTER-IMPLEMENTED METHOD AND SYSTEM FOR HANDLING AND TRANSFORMING DATABASE QUERIES IN A FOURTH GENERATION LANGUAGE

TECHNICAL FIELD

The present invention relates generally to computer-implemented database systems and more particularly, to database query operations.

BACKGROUND

A typical database access environment often requires that proprietary client applications interact effectively with databases. When retrieving data from such databases, such client applications require query engine formulated queries, typically in structured query language ("SQL") being passed down and processed by the database for performance. However, in order for the SQL query to operate effectively, it must be free of any specific client application syntax that the databases do not support.

Since a premium is placed on reducing processing cycles, it is desirable to issue queries which result in as little data being returned as possible. If the query is such that it does not narrow down the amount of data to a manageable level, too much data is returned to the client side which results in an extensive amount of processing and expense for the client.

One prior art system provides a system and method for analyzing one or more SQL/on-line analytical programming (OLAP) window aggregates that are not supported by a target database system, for transforming the SQL/OLAP windowed aggregates into semantically equivalent standard aggregate functions that are supported by the target database system. However, the method and system described only addresses group query transformations in a database system that does not support the SQL-99 standard. Thus, the solution only applies to a specific standard and does not provide an effective general solution for a fourth generation language environment between a native system and a non-native database system for processing queries.

Another prior art solution provides a computer-implemented system and method for handling a database statement from a first database system. The database statement is formatted according to a language format used by the first database system so that a database specific statement may be generated which is operational within a different type of database system. However, such a system and method is limited only to queries between different database systems and fails to provide a broader solution which operates across multiple platforms and types of systems. There is thus a need to prevent or reduce the amount of local processing required to process a query, which is provided in accordance with the computer-implemented method and system described herein.

SUMMARY

In accordance with the teachings provided herein a system and method are provided for generating a query in a first fourth generation language at a native system. The query is intended for a non-native database system capable of processing queries in a second fourth generation language. A query initiated by a client application in the first fourth generation language on a native system, and which is directed to the non-native system database, is analyzed. Through the analysis, specific non-standard syntax representative of a function in the query that cannot be evaluated by the non-native database system, is analyzed. If the syntax is discovered, the query is transformed through the use of formats into an equivalent query expression that can be processed by the non-native database system. Alternatively, the query may be transformed through an algorithmic process. The transformed equivalent query expression is transmitted to the non-native database system for having the non-native database system return results responsive to the query, to the client application.

DETAILED DESCRIPTION

Figure 1:
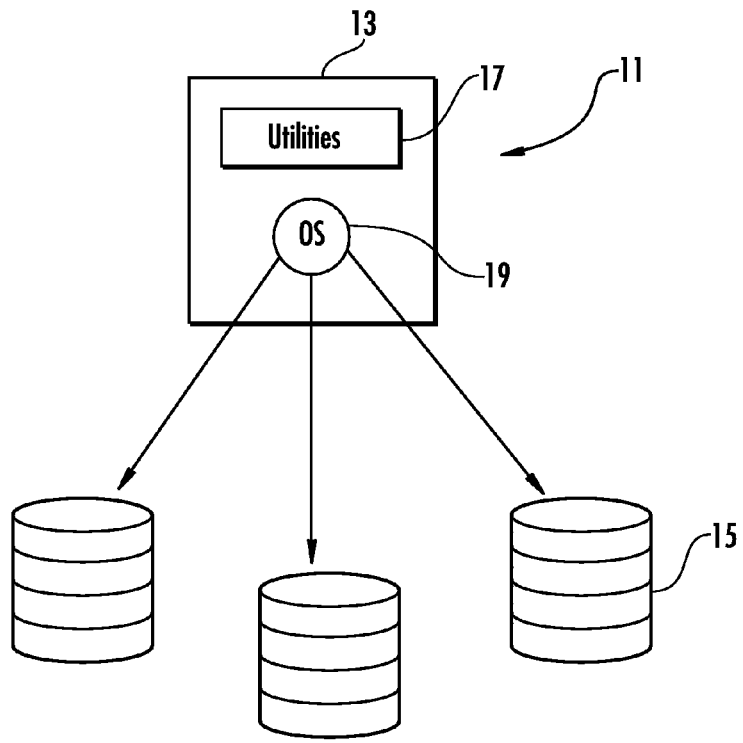
FIG. 1 is a block diagram depicting a general environment in which a system having an operating system is connected to multiple database systems.

FIG. 1 depicts a system 11 in which a computer 13 is connected for transferring data to and from database systems 15. The computer device 13 may include utility applications 17 as well as an operating system 19 which operates in a conventional manner well known to those of ordinary skill.

Figure 2:
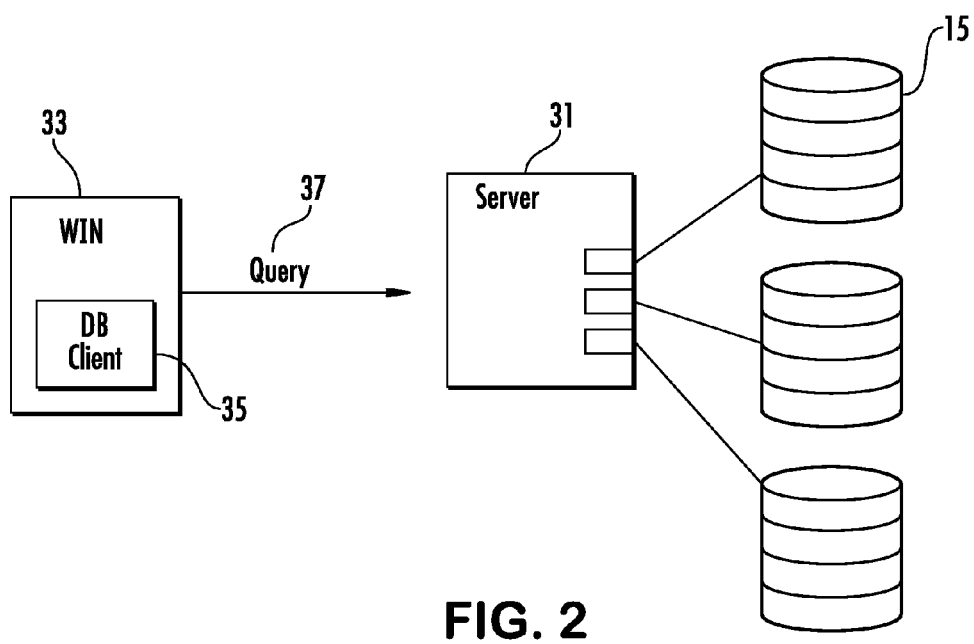
FIG. 2 is a schematic diagram illustrating how a Windows based system, including a database client, issues queries through a server to multiple database systems.

FIG. 2 depicts a more detailed view of a computer system for operating with database systems 15. The database systems 15 are optionally connected to a server 31 which is conventional. The server 31 may have one or more user systems 33, for example, a Windows based system including a database client application 35 loaded thereon for issuing queries 37, connected to the server 31 to retrieve data from the database systems 15.

Figure 3:
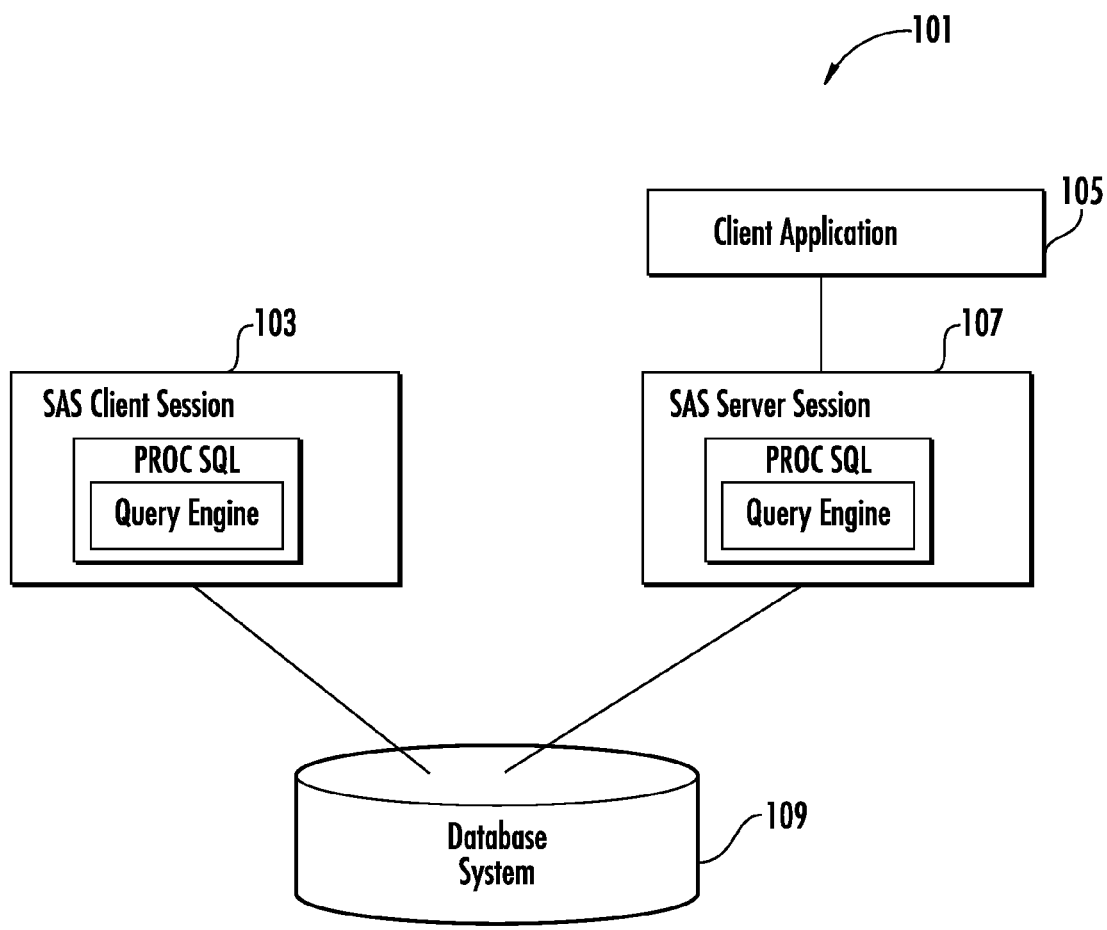
FIG. 3 is a schematic diagram illustrating in greater detail a typical data access environment in which a client system directly accesses a database system, or in which a client application accesses a database system through a proprietary server application.

FIG. 3 depicts a system 101 implementing an architecture which includes aspects of the systems depicted in FIGS. 1 and 2. In the system 101 of FIG. 3, a client computer 103 having a query engine is shown connected directly to a database system 109. Similarly, a client computer 105 with a client application can also be connected to the database system 109 through a server 107.

In the system depicted in FIG. 3, both the client computer 103, and client computer 105 connected through the server 107, are running applications developed using what is known as a fourth generation programming language ("4GL"). 4GL is a programming language or programming environment that is designed with a specific purpose in mind, such as the development of commercial business software. In the evolution of computing, 4GL followed 3GL in an upward trend toward higher abstraction and statement power. 4GL solutions are oriented towards problem solving and system engineering. 4GL is designed to reduce programming efforts, i.e., the time it takes to develop software, and the costs of software development. Many current 4GL types are tied to a database system.

FIG. 3 depicts a 4GL environment specific to applications developed and commercially available from SAS Institute, ("SAS") which provides statistical analysis software as an integrated system of software products that provide a number of business solutions.

In this exemplary embodiment, the client computer 103 or a client computer 105, operating through the server 107, specifically includes a SAS program implementing the SAS procedure known as PROC SQL. PROC SQL includes a query engine. The application relies on SQL queries being passed down and processed by the database system 109. This implies that the queries are free of specific syntax that the database system 109 does not have the ability to process. Many 4GL programs, such as SAS PROC SQL implement program technology that implicitly passes an SQL query to the database system 109 if it is free of specific syntax and meets other criteria.

It is well known that business intelligence software, such as the many solutions commercial available from SAS routinely generate SQL queries that filter and return formatted data. The formatted data is then used to populate tables and graphs and reports that are displayed to an end user. In a specific exemplary embodiment, a SAS function known as "put(var, fmt)", referenced hereafter as the "put( )" function is used in SQL queries to describe how SAS/PROC SQL is to format result values used in query processing. The put( ) function in this case is a SAS Institute program specific function, much as there are other specific functions common to other program solutions available from other companies providing 4GL developed programs.

When such a function is implemented, the query engine searches data from the database system 109, such as a database system available from companies such as Oracle, DB2, Teradata, and others. The data is imported into the PROC SQL processing environment where the formatting work for the put( ) function is preformed. An SQL query containing a reference to the put( ) function fetches the data into the client specific environment 103, 105 and 107 to operate on the data. When table sizes are large, the performance of fetching all data measured in response time degrades. This becomes a greater problem as 4GL product integration with third party databases expand and the popularity of using formatted data increases. A result is that more and more of the queries are not passed to the database. To solve this problem, a method and system is implemented which allows transformation of many functions such as the put( ) function into an alternate SQL syntax which may be passed and operated on by the database system 109.

Figure 4:
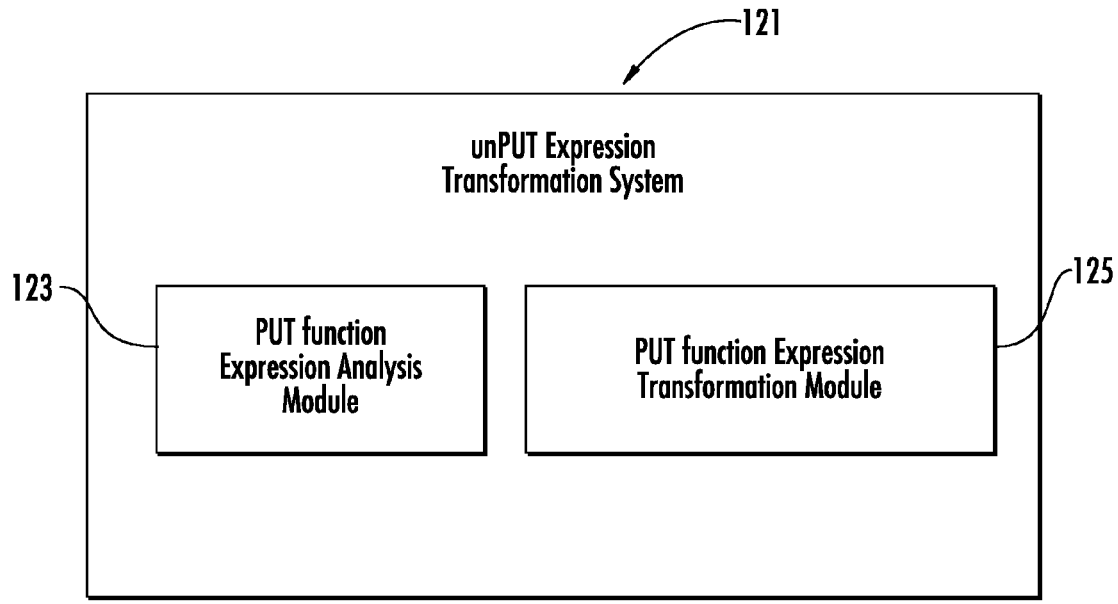
FIG. 4 illustrates an expression transformation system as broadly described with reference to the invention.

FIG. 4 depicts a transformation system 121, in accordance with an embodiment of the present invention. The transformation system 121 is illustrated in an exemplary embodiment as being specific to transforming a put( ) expression in a SAS PROC SQL environment. An analysis module 123 analyzes the put( ) function which is not supported by a target database system. A transformation module 125 serves to transform the put( ) function into a semantically equivalent function that is supported by the target database system.

Figure 5:
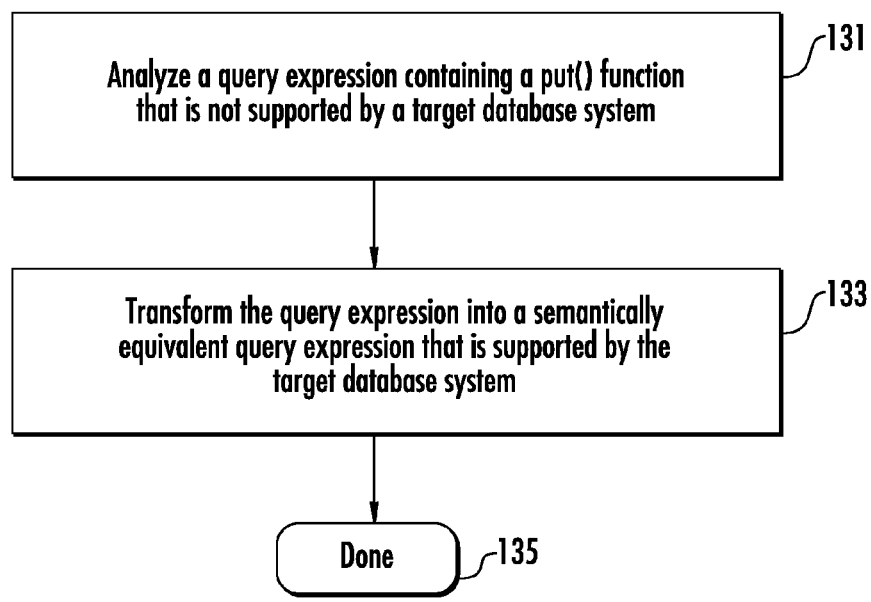
FIG. 5 shows in a simple flow chart, an example of analysis of a query expression and transformation of the query expression into one that is supported by a target database system.

Thus, in its simplest form as depicted in the flow chart of FIG. 5, a query expression containing a put( ) function that is not supported by a target database system is analyzed 131. The query expression is transformed 133 into a semantically equivalent query expression supported by the target database system. The transformed query is passed 135 to the database system to operate thereon.

More particularly, during put( ) function expression analysis, the query is scanned for the occurrence of the put( ) function. An evaluation is conducted to determine whether the put( ) function is contained within an expression or subexpression that can be transformed. If it is determined that a put( ) function can be transformed, it is transformed into a semantically equivalent expression that can be processed by the target database, as previously described.

The expression transformation system 121 is capable of operating on both formats built directly into the 4GL system, i.e., in this case the SAS system, and PROC Format style formats created by SAS users such as those of the client application on the client computer 105 illustrated in FIG. 3.

Thus, with reference to fourth generation languages (4GL) in general, there is provided a computer-implemented method for generating a query in a first fourth generation language at a native system, which is directed to a non-native database system capable of processing queries in a second fourth generation language. In accordance with the invention, a query initiated by a client application in a first fourth generation language of a native system is analyzed prior to such a query being directed to a non-native system capable of processing queries in a second fourth generation language.

Specific non-standard syntax representative of functions in the query that cannot be evaluated by the non-native database system is identified. If the specific syntax is discovered, the query is transformed through the use of formats into an equivalent query expression that can be processed by the non-native database system. The equivalent query expression is then transmitted to the non-native database system for having a non-native database system return results responsive to the query, to the client application. In a more specific aspect, the formats operate to transform numbers or strings into other strings. Optionally the equivalent query expression is generated in an iterative manner from a list of formats.

Alternatively, if the specific syntax is discovered, the query may be transformed through an algorithmic process into an equivalent query expression that may be processed by the database system. The equivalent query is then transmitted to the non-native database system. In the case of the algorithmic process, it is designed to transform numeric and character data into character data.

Figure 6:
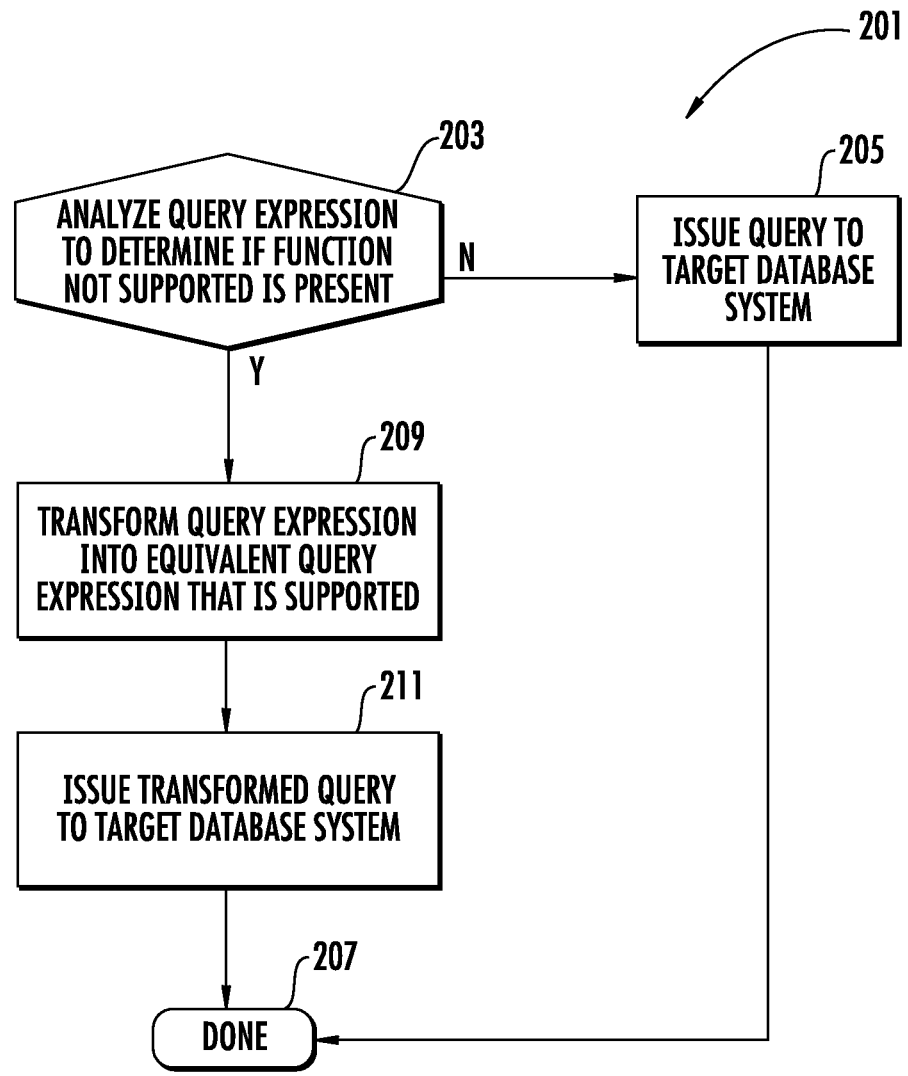
FIG. 6 illustrates in greater detail a flow chart in which a query can be issued to a target database system in a manner capable of being handled by the database system.

FIG. 6 depicts a more detailed flow chart 201 illustrating the process in somewhat greater detail than FIG. 5. More specifically, if a query is initiated by a native system to a non-native database, it is analyzed 203 to determine if a specific function not supported by the target database system is present in the query. If the answer is no, the query is issued 205 to the target database system and once processing is completed the process terminates 207.

Alternatively, if such a function is present, the query expression is transformed 209 into a equivalent query expression that is supported by the target database system. Once the transformation occurs, the transformed query is issued 211 to the target database system wherein it is processed, and after processing, the data is returned and the processes terminates 207.

Figure 7:
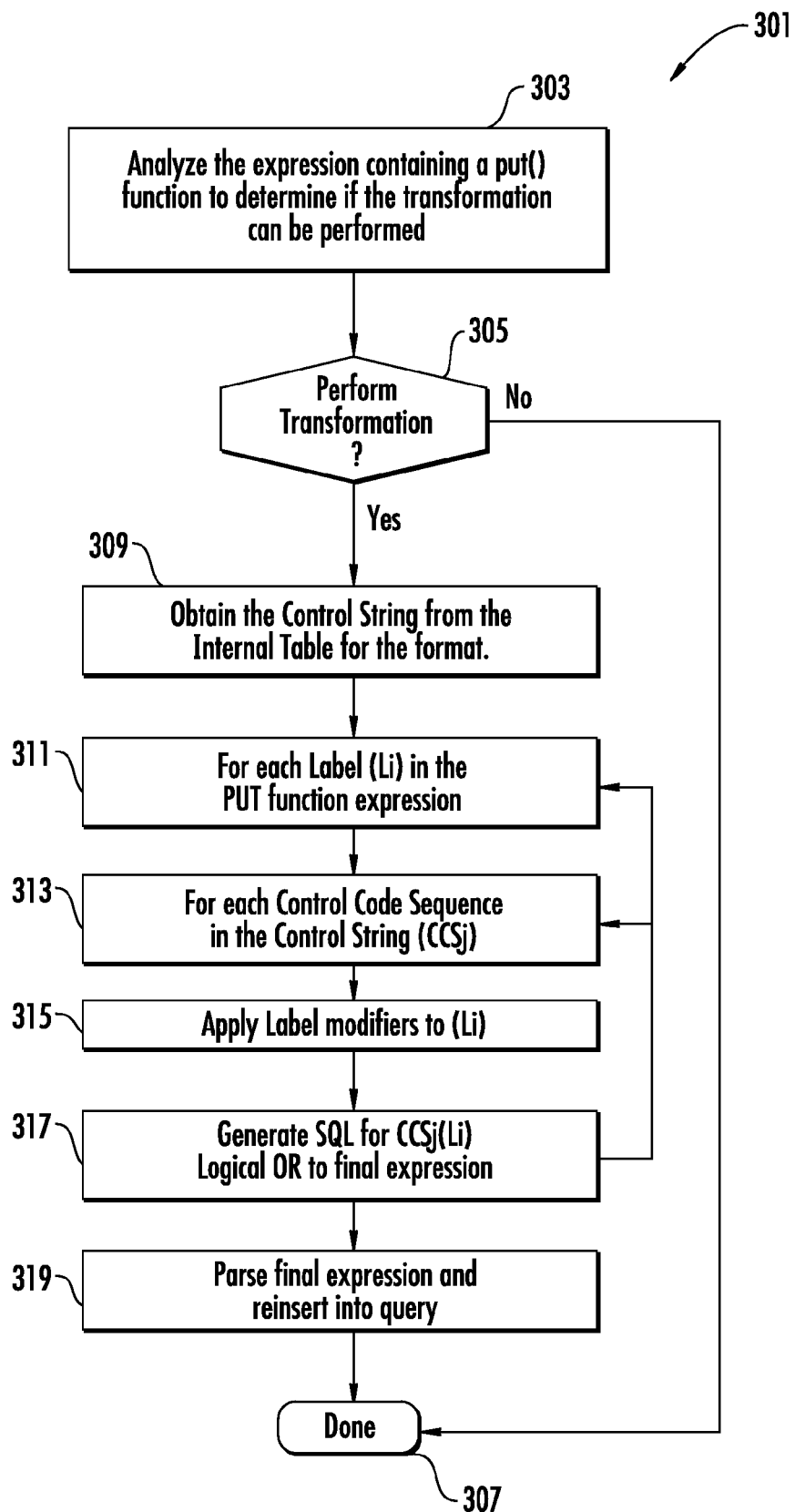
FIG. 7 is a flow chart illustrating one embodiment of the invention employing formats to achieve a transformation of a query in a first fourth generation language, into a second fourth generation language supported by a database system.

FIG. 7 illustrates one specific algorithm for transforming a put( ) function for date and time formats built in, for example, a client session such as that illustrated by computer 103 of FIG. 3. More specifically, FIG. 7 depicts a flow chart 301 illustrating how the put( ) function expression for intrinsic date, time, and date/time formats in a SAS fourth generation language program environment is template based, as will be described hereafter in greater detail with reference to Examples 4 and 5 and FIG. 10 herein.

Initially, an expression containing a put( ) function is analyzed 303 to determine if the transformation can be performed. If the transformation cannot be performed 305, the process does not issue the query and the process ends 307. If the transformation can be performed, a control string from an internal table for the format is obtained 309. This is done for each label in the put( ) function expression 311. In addition, this is also done 313 for each control code sequence in the control string. Label modifiers are applied 315 and the SQL query is generated 317. It is appropriate to note that the process is iterative as shown by the return arrows in flow chart 301. Once all iterations are completed, then the final expression is parsed 319 and reinserted into the query, and the process ends 307.

In a more specific aspect, there is an internal table containing control strings for each supported format describing the layout for a valid label. The table is built into the system, and the format name and width are used to do a look up of the control string. The control string is used during processing to parse through labels to pick up the parts needed to generate the alternate SQL expression. The control string gives insight as to what the expression will look like.

By way of further illustration, set forth hereafter are examples of what the control strings look like for the DDM-MYY format.

```
/*DDMMYY format control strings based on widths 2-10*/
{ 2, 3,"%P%0d"},
{ 4, 4,"%P%0d%0m"},
{ 5, 5,"%P%0d/%0m"},
{ 6, 7,"%P%0d%0m%0y"},
{ 8, 9,"%P%0d/%0m/%0y"},
{10,10,"%P%0d/%0m/%Y"},
```

In the above example, the first number is the minimum width, and the second number is the maximum width which can be used with the control string for the DDMMYY format. The control string is broken down into parts, i.e., % P, % 0d, % 0m, % Y, etc. Each has a different meaning to the code that processes the put( ) function expression.

By way of future exemplary illustration, the following is a table illustrating control codes and the meaning in the SAS fourth generation language developed program.

| Control Code | Meaning |
| --- | --- |
| % d | day of month (no leading zero for 1-9) |
| % 0d | day of month (with leading 0 for 1-9) |

-continued

| Control Code | Meaning |
| --- | --- |
| % y | year without century digits (no leading zero for 1-9) |
| % 0y | year without century digits (with leading zero for 1-9) |
| % Y | 4-digit year |
| % H | hour of day (no leading zero for 0-9) |
| % 0H | hour of day (leading zero for 0-9) |
| % M | minute of hour (no leading zero for 0-9) |
| % 0M | minute of hour (leading zero for 0-9) |
| % S | second of minute (no leading zero for 0-9) |
| % 0S | second of minute (leading zero for 0-9) |
| % A | full name of weekday |
| % B | full name of month |
| % a | abbreviated weekday name |
| % b | abbreviated month name |
| % ub | abbreviated month name all uppercased |
| % u1b | abbreviated month name only first character uppercased |
| % w | day of week (1 = Sunday, 2 = Monday, etc.) |
| % j | Julian day of year |
| % q | quarter of year as digit 1-4 |
| % r | quarter of year as Roman numerals (I, II, III, IV) |
| % xA | weekday name, but can be truncated |
| % xB | weekday name, but can be truncated |
| % p | AM or PM |
| % Z | a datetime value is expected |
| % P | right justification in effect |

In discussing the invention, it should be understood that by the term "format" is meant a process by which numbers or strings are transformed into other strings as has been previously illustrated.

Figure 8:
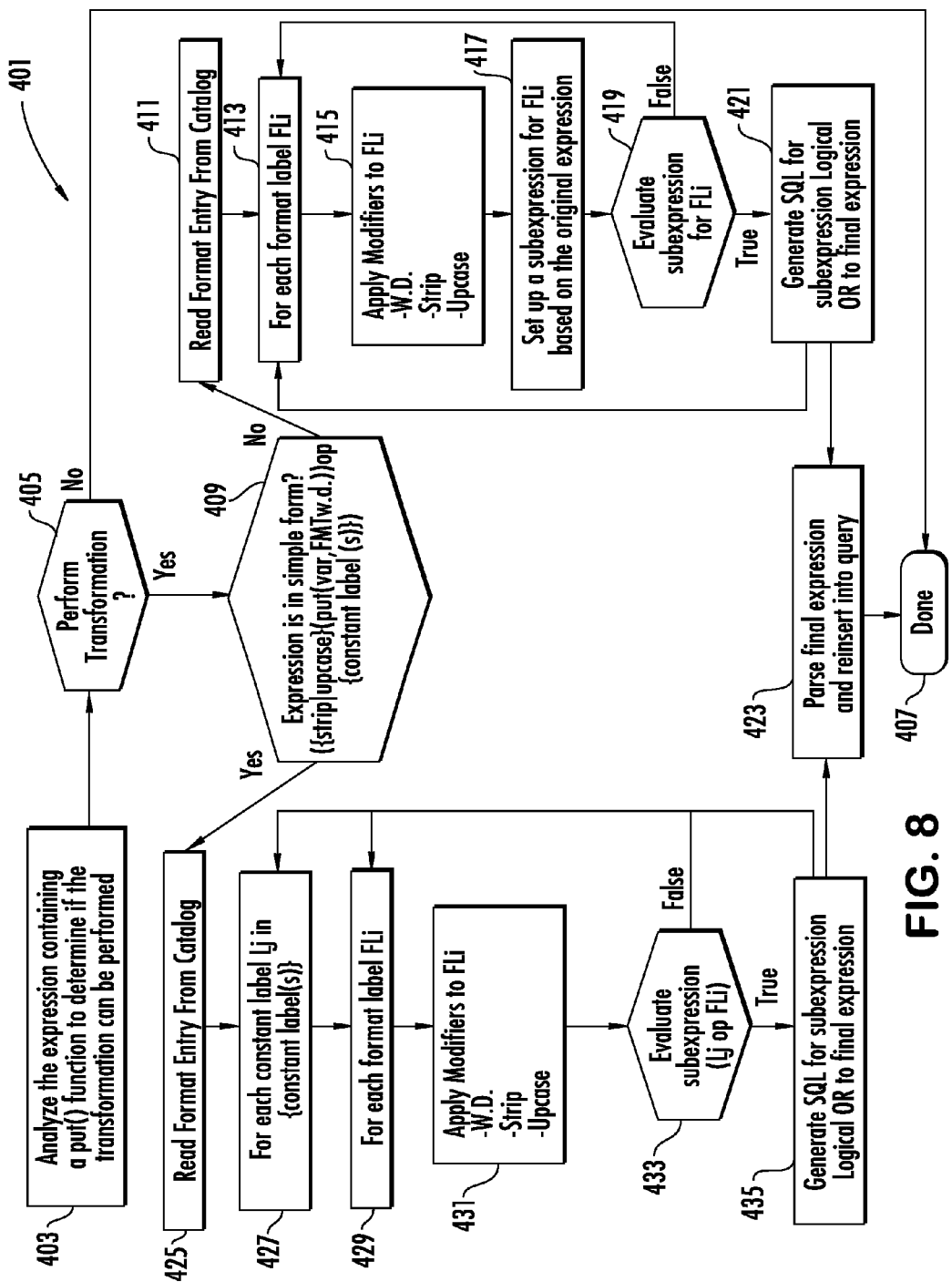
FIG. 8 is a flow chart illustrating how a first fourth generation language query can be transformed into a second fourth generation language query where the first generation language query includes specific user-defined formats.

In an alternative implementation, the invention is further described hereafter with reference to FIG. 8. In this case, user-defined formats such as may be generated by a system such as the client system 105 running a client application connecting to a database system 109 as illustrated in FIG. 3 used to issue queries. In such case, there are two sub-algorithms in the algorithm illustrated by flow chart 401 of FIG. 8. The process employed is intrinsic, and generally algorithmic for transforming numeric and character data into other character data as a function of the application. This contrasts to PROC format style transformation which uses tables and metadata. Thus, in the case of the user-defined format, when a user generates a PROC format query, the transformation is algorithmic.

If a format is created using PROC FORMAT, it is known as a user-defined format. In FIG. 8, if a user-defined format is used in the put( ) function expression, the function transformation module must decide whether the expression is in simple form, for example, ({strip|upcase}(put(var, FMTw.d)) op {constant label(s)}). If the expression is in simple form, the left hand side of the flow chart 401 is employed. Otherwise, the right hand side is employed. In this context, although the flow chart of FIG. 8 will be described, reference may also be made to FIGS. 9 and 11 and Examples 1, 2, 5 and 7 discussed hereafter.

Initially the expression containing a put( ) function is analyzed 403 to determine if the transformation can be performed. The determination 405 of whether the transformation can be performed is made and if the answer is no, then the query is not transformed and the process terminates 407. If yes, it is then determined if the expression is in simple form 409. If yes, then the format entry is read 425 from a catalog. This is done for each constant label 427 and for each format label 429. Modifiers are applied 431 and the sub-expression evaluated 433. If the sub-expression is acceptable, the SQL query is generated 435 for the sub-expression to a final expression. The final expression is parsed 423 and inserted into the query.

If the expression is not in simple form, a format entry is read 411 from the catalog. A function is performed 413 which includes applying modifiers 415, and sets up 417 a sub-expression based on the original expression. The sub-expression is then evaluated 419 and if it is acceptable, an SQL query is generated 421 for the sub-expression. The final expression is parsed and reinserted into the query 423.

In flow chart 401, it is noted that each sub-algorithmic process commences by performing a look up of the user-defined format definition to obtain a list of valid format labels and the value for each label. This is typically done by reading the format definition from the format catalog. In accordance with the invention, the expression is built by going through the list of supplied labels, for example, from the put( ) function expression, and matching them to labels for the user-defined format. For example, labels that match are turned into expression fragments.

By way of illustration, a label "medium" is set equal to (4<=size and size<=6), a label "small" is set equal to (1<=size and size<=3)), to contain the values for that label. Expression fragments are then combined with "OR's" to produce the final expression: (4<=size and size<=6) OR (1<=size and size<=3), as in Example 5.

As may be appreciated, the system works with user-defined time and date formats. The system also works with, in this exemplary embodiment, SAS date-time and time formats, the $ format, and the BEST format. In a specific implementation, over 275 SAS specific formats and different widths for each format are supported.

As described with reference to the SAS products, the following table indicates all the date/time formats and width ranges supported in the transformation function for the put( ) function (hereinafter interchangeably referred to as unPut).

| Supported unPUT Formats & widths | | | | | | | |
|---|---|---|---|---|---|---|---|
| AFRDFDD | 2-10 | AFRDFDE | 5-9 | AFRDFDN | 1-32 | AFRDFDT | 4-40 |
| AFRDFDWN | 1-32 | AFRDFMN | 1-32 | AFRDFMY | 5-7 | AFRDFWDX | 3-37 |
| AFRDFWKX | 2-38 | CATDFDD | 2-10 | CATDFDE | 5-9 | CATDFDN | 1-32 |
| CATDFDT | 7-40 | CATDFDWN | 1-32 | CATDFMN | 1-32 | CATDFMY | 5-32 |
| CATDFWDX | 3-40 | CATDFWKX | 2-40 | CRODFDD | 2-10 | CRODFDE | 5-9 |
| CRODFDN | 1-32 | CRODFDT | 7-40 | CRODFDWN | 1-32 | CRODFMN | 1-32 |
| CRODFMY | 5-32 | CRODFWDX | 3-40 | CRODFWKX | 3-40 | CSYDFDD | 2-10 |
| CSYDFDE | 10-14 | CSYDFDN | 1-32 | CSYDFDT | 12-40 | CSYDFDWN | 1-32 |
| CSYDFMN | 1-32 | CSYDFMY | 10-32 | CSYDFWDX | 8-40 | CSYDFWKX | 2-40 |
| DANDFDD | 2-10 | DANDFDE | 5-9 | DANDFDN | 1-32 | DANDFDT | 7-40 |
| DANDFDWN | 1-32 | DANDFMN | 1-32 | DANDFMY | 5-7 | DANDFWDX | 3-18 |
| DANDFWKX | 2-31 | DATE | 5-11 | DATEAMPM | 7-40 | DATETIME | 7-40 |
| DAY | 2-32 | DDMMYY | 2-10 | DDMMYYB | 2-10 | DDMMYYC | 2-10 |
| DDMMYYD | 2-10 | DDMMYYN | 2-8 | DDMMYYP | 2-10 | DDMMYYS | 2-10 |
| DESDFDD | 2-10 | DESDFDE | 5-9 | DESDFDN | 1-32 | DESDFDT | 7-40 |
| DESDFDWN | 1-32 | DESDFMN | 1-32 | DESDFMY | 5-7 | DESDFWDX | 3-18 |
| DESDFWKX | 2-30 | DEUDFDD | 2-10 | DEUDFDE | 5-9 | DEUDFDN | 1-32 |
| DEUDFDT | 7-40 | DEUDFDWN | 1-32 | DEUDFMN | 1-32 | DEUDFMY | 5-7 |
| DEUDFWDX | 3-18 | DEUDFWKX | 2-30 | DOWNAME | 1-32 | DTDATE | 5-9 |
| DTMONYY | 5-7 | DTWKDATX | 3-37 | DTYEAR | 2-4 | DTYYQC | 4-6 |
| ENGDFDD | 2-10 | ENGDFDE | 5-9 | ENGDFDN | 1-32 | ENGDFDT | 7-40 |
| ENGDFDWN | 1-32 | ENGDFMN | 1-32 | ENGDFMY | 5-7 | ENGDFWDX | 3-32 |
| ENGDFWKX | 3-37 | ESPDFDD | 2-10 | ESPDFDE | 5-9 | ESPDFDN | 1-32 |
| ESPDFDT | 7-40 | ESPDFDWN | 1-32 | ESPDFMN | 1-32 | ESPDFMY | 5-7 |
| ESPDFWDX | 3-24 | ESPDFWKX | 1-35 | FINDFDD | 2-10 | FINDFDE | 8-10 |
| FINDFDN | 1-32 | FINDFDT | 7-40 | FINDFDWN | 1-32 | FINDFMN | 1-32 |
| FINDFMY | 8 | FINDFWDX | 3-20 | FINDFWKX | 2-37 | FRADFDD | 2-10 |
| FRADFDE | 5-9 | FRADFDN | 1-32 | FRADFDT | 7-40 | FRADFDWN | 1-32 |
| FRADFMN | 1-32 | FRADFMY | 5-7 | FRADFWDX | 3-18 | FRADFWKX | 3-27 |
| FRSDFDD | 2-10 | FRSDFDE | 5-9 | FRSDFDN | 1-32 | FRSDFDT | 7-40 |
| FRSDFDWN | 1-32 | FRSDFMN | 1-32 | FRSDFMY | 5-7 | FRSDFWDX | 3-18 |
| FRSDFWKX | 3-27 | HUNDFDD | 2-10 | HUNDFDE | 12-14 | HUNDFDN | 1-32 |
| HUNDFDT | 12-40 | HUNDFDWN | 1-32 | HUNDFMN | 1-32 | HUNDFMY | 9-32 |
| HUNDFWDX | 6-40 | HUNDFWKX | 3-40 | IS8601DA | 10 | IS8601DN | 10 |
| IS8601DT | 19-26 | IS8601DZ | 20-35 | IS8601TM | 8-15 | IS8601TZ | 9-20 |
| ITADFDD | 2-10 | ITADFDE | 5-9 | ITADFDN | 1-32 | ITADFDT | 7-40 |
| ITADFDWN | 1-32 | ITADFMN | 1-32 | ITADFMY | 5-7 | ITADFWDX | 3-17 |
| ITADFWKX | 3-28 | JULDATE | 5-32 | JULDAY | 3-32 | MACDFDD | 2-10 |
| MACDFDE | 5-9 | MACDFDN | 1-32 | MACDFDT | 7-40 | MACDFDWN | 1-32 |
| MACDFMN | 1-32 | MACDFMY | 5-32 | MACDFWDX | 3-40 | MACDFWKX | 3-40 |
| MDYAMPM | 8-16 | MMDDYY | 2-10 | MMDDYYB | 2-10 | MMDDYYC | 2-10 |
| MMDDYYD | 2-10 | MMDDYYN | 2-8 | MMDDYYP | 2-10 | MMDDYYS | 2-10 |
| MMYY | 5-32 | MMYYC | 5-32 | MMYYD | 5-32 | MMYYN | 4-32 |
| MMYYP | 5-32 | MMYYS | 5-32 | MONNAME | 1-32 | MONTH | 1-32 |
| MONYY | 5-7 | NLDDFDD | 2-10 | NLDDFDE | 5-9 | NLDDFDN | 1-32 |
| NLDDFDT | 7-40 | NLDDFDWN | 1-32 | NLDDFMN | 1-32 | NLDDFMY | 5-7 |
| NLDDFWDX | 3-37 | NLDDFWKX | 2-38 | NORDFDD | 2-10 | NORDFDE | 5-9 |
| NORDFDN | 1-32 | NORDFDT | 7-40 | NORDFDWN | 1-32 | NORDFMN | 1-32 |
| NORDFMY | 5-7 | NORDFWDX | 3-17 | NORDFWKX | 3-26 | POLDFDD | 2-10 |
| POLDFDE | 5-9 | POLDFDN | 1-32 | POLDFDT | 7-40 | POLDFDWN | 1-32 |
| POLDFMN | 1-32 | POLDFMY | 5-32 | POLDFWDX | 3-40 | POLDFWKX | 2-40 |
| PTGDFDD | 2-10 | PTGDFDE | 5-9 | PTGDFDN | 1-32 | PTGDFDT | 7-40 |
| PTGDFDWN | 1-32 | PTGDFMN | 1-32 | PTGDFMY | 5-7 | PTGDFWDX | 3-37 |
| PTGDFWKX | 3-38 | QTR | 1-32 | QTRR | 3-32 | RSTDODB | 6-32 |
| RSTDOMN | 1-32 | RSTDOMY | 12-32 | SLODFDD | 2-10 | SLODFDE | 5-9 |
| SLODFDN | 1-32 | SLODFDT | 7-40 | SLODFDWN | 1-32 | SLODFMN | 1-32 |

| \multicolumn{8}{c}{Supported unPUT Formats & widths} |
|---|---|---|---|---|---|---|---|
| SLODFMY | 5-32 | SLODFWDX | 3-40 | SLODFWKX | 3-40 | SVEDFDD | 2-10 |
| SVEDFDE | 5-9 | SVEDFDN | 1-32 | SVEDFDT | 7-40 | SVEDFDWN | 1-32 |
| SVEDFMN | 1-32 | SVEDFMY | 5-7 | SVEDFWDX | 3-17 | SVEDFWKX | 3-26 |
| TIME | 2-20 | TIMEAMEM | 2-20 | TOD | 2-20 | TWMDY | 15-35 |
| WEEKDATE | 3-37 | WEEKDATX | 3-37 | WEEKDAY | 1-32 | WORDDATE | 3-32 |
| WORDDATX | 3-32 | XYYMMDD | 6-12 | YEAR | 2-32 | YYMM | 5-32 |
| YYMMC | 5-32 | YYMMD | 5-32 | YYMMDD | 2-10 | YYMMDDB | 2-10 |
| YYMMDDC | 2-10 | YYMMDDD | 2-10 | YYMMDDN | 2-8 | YYMMDDP | 2-10 |
| YYMMDDS | 2-10 | YYMMN | 4-32 | YYMMP | 5-32 | YYMMS | 5-32 |
| YYMON | 5-32 | YYQ | 4-32 | YYQC | 4-32 | YYQD | 4-32 |
| YYQN | 3-32 | YYQP | 4-32 | YYQR | 6-32 | YYQRC | 6-32 |
| YYQRD | 6-32 | YYQRN | 5-32 | YYQRP | 6-32 | YYQRS | 6-32 |
| YYQS | 4-32 | YYQZ | 4-6 | | | | |

In addition as it relates to SAS applications, certain date and time formats use the following functions which are undocumented to generate expressions that can be passed to the databases.

DTEXTMONTH—equivalent to MONTH(DATEPART(x))

DTEXTDAY—equivalent to DAY(DATEPART(x))

DTEXTYEAR—equivalent to YEAR(DATEPART(x))

DTEXTWEEKDAY—equivalent to WEEKDAY(DATEPART(x))

Further, with respect to SAS specific formats, one or more of the date/time functions "DTEXTYEAR", "DTEXTMONTH", "DTEXTDAY", "DTEXTWEEKDAY", "DTEXTMONTH" are used in the final result string. Such functions are transformed into their database equivalent functions and parsed to the database as part of the query.

The following table list formats that cause unPut to generate DTEXT functions in a transformed SQL query.

| Format | Width(s) |
|---|---|
| AFRDFDD | 2-10 |
| AFRDFDE | 5-9 |
| AFRDFDT | 7-10, 12-13, 15-16, 18-19, 40 |
| CATDFDT | 7-10, 12-13, 15-16, 18-19, 40 |
| CRODFDT | 7-10, 12-13, 15-16, 18-19, 40 |
| CSYDFDT | 12, 17-18, 20-21, 40 |
| DANDFDT | 7-10, 12-13, 15-16, 18-19, 40 |
| DATEAMEM | 7-10, 12-13, 15-16, 18-19, 21-22, 40 |
| DATETIME | 7-10, 12-13, 15-16, 18-19, 40 |
| DESDFDT | 7-10, 12-13, 15-16, 18-19, 40 |
| DEUDFDT | 7-10, 12-13, 15-16, 18-19, 40 |
| DTDATE | 5-9 |
| DTMONYY | 5-7 |
| DTWKDATX | 3, 8, 9, 14-17, 22-23, 28-29, 37 |
| DTYEAR | 2-4 |
| DTYYQC | 4-6 |
| ENGDFDT | 7-10, 12-13, 15-16, 18-19, 40 |
| ESPDFDT | 7-10, 12-13, 15-16, 18-19, 40 |
| FINDFDT | 7, 12-14, 15, 17-19, 40 |
| FRADFDT | 7-10, 12-13, 15-16, 18-19, 40 |
| FRSDFDT | 7-10, 12-13, 15-16, 18-19, 40 |
| HUNDFDT | 12-14, 16-17, 19-20, 40 |
| IS8601DN | 10 |
| IS8601DT | 19-26 |
| IS8601DZ | 20, 24-25, 35 |
| ITADFDT | 7-10, 12-13, 15-16, 18-19, 40 |
| MACDFDT | 7-10, 12-13, 15-16, 18-19, 40 |
| NLDDFDT | 7-10, 12-13, 15-16, 18-19, 40 |
| NORDFDT | 7-10, 12-13, 15-16, 18-19, 40 |
| POLDFDT | 7-10, 12-13, 15-16, 18-19, 40 |
| PTGDFDT | 7-10, 12-13, 15-16, 18-19, 40 |
| SLODFDT | 7-10, 12-13, 15-16, 18-19, 40 |

-continued

| Format | Width(s) |
|---|---|
| SVEDFDT | 7-10, 12-13, 15-16, 18-19, 40 |
| TWMDY | 15-23, 28-29, 34-35 |

As may be appreciated by those of ordinary skill in the art, using the flow charts of FIGS. 7 and 8, there are many types of expressions that can be supported with a system and method as described herein. Such expressions include:

Equals, put(birthday, date9.)='01JAN2000';

Not equals, put(birthday, date9.)^='01JAN2000';

Variable expressions, put(anniv+30, date9.)='11Feb2000'

IN, NOT IN clauses, put(size, udfmt.) in ('small', 'large')

LIKE, NOT LIKE clauses, put(size, udfmt.) like "small"

CONTAINS, NOT CONTAINS clauses, put(type, udfmt.) contains "s"

BETWEEN, NOT BETWEEN clauses, put(size, udfmt.) between 'small' and 'large'

STRIP or TRIM(LEFT( )) functions, strip(put(x, udfmt.)) in ('small', 'medium')

UPCASE function, upcase(put(bday, date5.))='01JAN'

In a further exemplary embodiment of the invention, in addition to the foregoing, two examples of nested functions, i.e., upcase and strip, are recognized. Such functions are treated as label modifiers, and are applied prior to sub-expression evaluation for each label.

Queries that employ inequalities, other operators, or other types of functions that do not fit the simple form are considered complex, such as, i.e., index(put(color, nudfmt.), "RED")>0)), will employ the right side of flow chart 401 in FIG. 8, as also further described hereafter with reference to Example 7.

The following specific examples describe embodiments of the invention in a SAS environment. These are examples of types of targeted queries and transformed equivalent expressions which can be achieved in accordance with the method and system of the invention.

EXAMPLE 1

```
proc format;
    value udfmt 1-3='small' 4-6='medium' 7-9='large';
run;
Proc sql;
    select style as SmallStyles from db.clothes
        where put(size, udfmt.) = 'small';
quit;
```

As written, the query cannot be passed down to the database for execution, because it uses a put( ) function containing a user-defined format. However, as implemented in PROC SQL, this invention recognizes the expression put(size, udfmt.)='small'. In accordance with the invention, the function looks up the definition of the udfmt format to find the allowed values for the label 'small' (1-3 in this example), and a new where clause is constructed (see FIG. 9).

(1<=size and size<=3)

This new expression is parsed and reinserted back into the in-memory structure used to process the query (known as the SQL tree). Query processing is allowed to continue, and with the put( ) function removed, the query can now be passed to the database. As a result, it is likely that fewer records will be returned, and this results in increased performance and less processing of records by Proc SQL. The final query passed to the database looks like:

select style as SmallStyles from db.clothes where (1<=size and size<=3);

Even when not using a database table, i.e. a SAS/Base table, an evaluation of the new expression is still simpler than to process the put( ) function.

This example uses a user-defined format to query for certain size categories.

Figure 9:
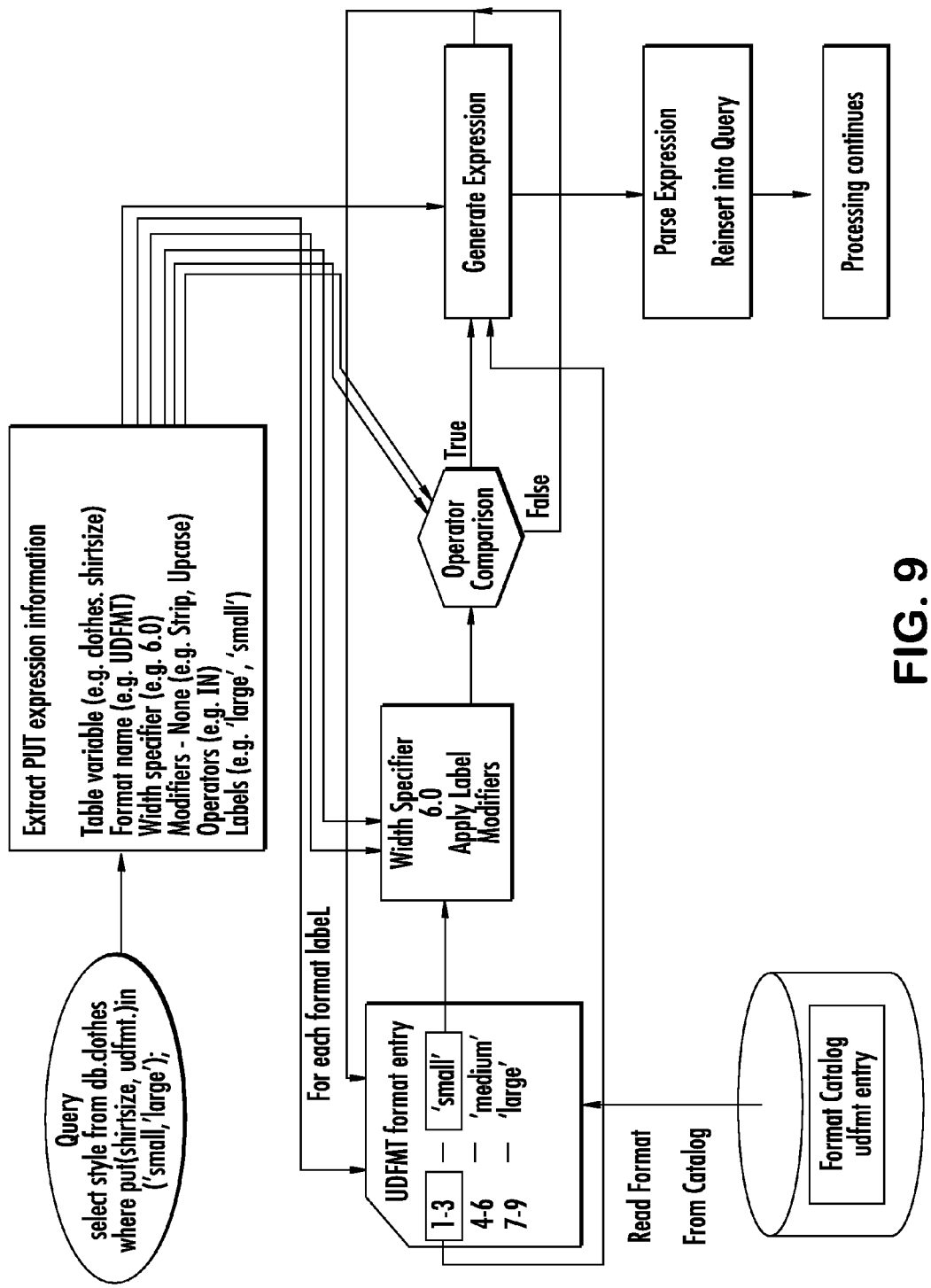
FIG. 9 illustrates a transformation of a query in accordance with Examples 1, 2 and 5 described herein.

As previously noted, this example is further illustrated in FIG. 9 hereof.

EXAMPLE 2

```
proc format;
    value udfmt 1-3='small' 4-6='medium' 7-9='large';
run;
Proc sql;
    select style from db.clothes where put(size, udfmt.) not in
    ('small', 'large');
quit;
```

The system and method works with many different types of put( ) function expressions. Described herein is a situation involving a "where" clause that contains NOT and IN operations. The following simpler expression is generated, which can be passed to the databases.

NOT((7<=size and size<=9) OR (1<=size and size<=3))

This example is also illustrated by the diagram of FIG. 9.

EXAMPLE 3

The formatting and comparing of dates is a very common operation in the Business Intelligence area. This example shows how unPUT technology can be used to simplify the comparison of formatted dates. Suppose it is important to look at a population sample of people born on New Year's Day. By typing the date into a graphical user interface ("GUI"), the query generated for it looks somewhat like the following:

```
Proc sql;
    select name from db.employees where (put(birthday, date5.) =
    '01JAN');
quit;
```

In this example there is no user-defined list of values to substitute for the label '01JAN'. Instead, other functions are used (i.e. DAY, MONTH) to perform the transformation. The expression, (put(birthday, date5.)='01JAN'), then is transformed into (MONTH(birthday)=1 AND DAY(birthday)=1)

From the commercially available SAS SQL Implicit Passthru software technology, the MONTH and DAY SAS functions are mapped to their equivalent database functions (e.g., EXTRACT for Oracle commercially available products) to perform the proper operation. So once again, a query has been transformed involving formatted data into a query that can be passed to the databases.

Figure 10:
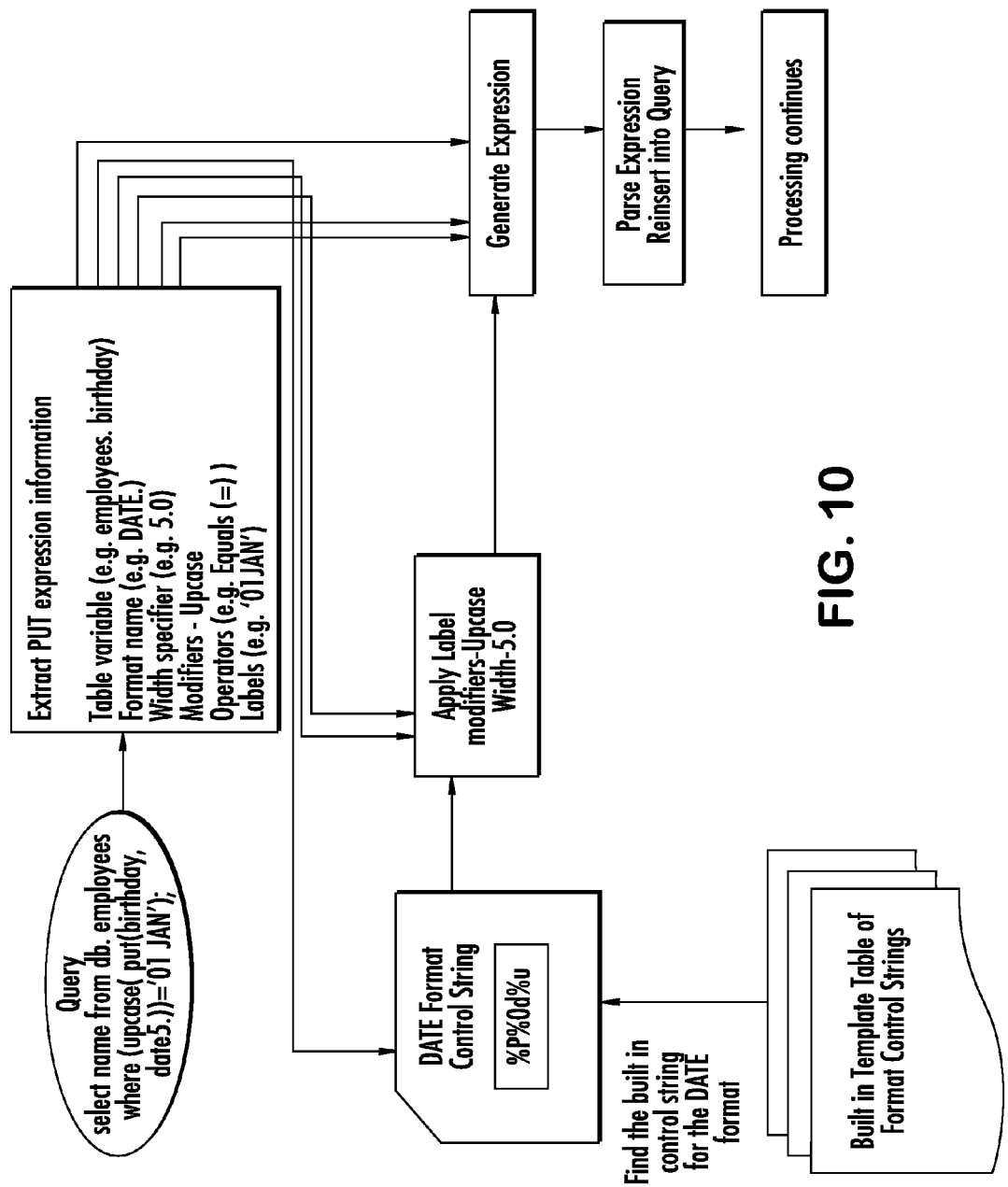
FIG. 10 illustrates a transformation of a query in accordance with Examples 3 and 4 described herein.

This example is further illustrated by the diagram of FIG. 10.

EXAMPLE 4

Placing a call to upcase( ) around the put( ) function call causes the result from the put( ) to be converted to upper case. This is common practice when comparing normalized values. This operation is performed as part of its expression rewrite. The following query is an example:

```
Proc sql;
    select name from db.employees
        where (upcase(put(birthday, date5.)) = '01JAN');
quit;
```

As in Example 3, this invention will substitute the where clause for this clause.

```
Proc sql;
    select name from db.employees
        where (MONTH(birthday)=1 AND DAY(birthday)=1)
quit;
```

The query can now be passed down to the database.

As in the case with Example 3, this Example is also further illustrated by FIG. 10.

EXAMPLE 5

Comparisons involving columns with leading and trailing blanks can often be a problem. To solve the problem, the STRIP (or TRIM(LEFT( ))) function is often used. This can be handled by the system and method described. The following query is an example:

```
Proc sql;
    select style as Styles from db.clothes
        where strip(put(size, udfmt.)) in ( 'small', 'medium');
quit;
```

The where clause will be rewritten as (4<=size and size<=6) OR (1<=size and size<=3)

All of the work to normalize and check for missing labels is handled within the system and method as part of regenerating the query. If it is found that an expression can never be true, the zero (0—false) "where" clause is returned, further simplifying the processing of the query.

This example is further illustrated by the diagram of FIG. 9.

EXAMPLE 6

The system and method also supports the $ and BEST formats. Since it is the default format for SAS Web Report Studio, put(s, $.) and put(x, best.) commonly occur in the query generation of that application. put(s, $.) is also one expression that can be optimized in the select list. For example:

```
proc sql;
    select put(s, $.) as DIR_1 from db.t1
        where strip(put(size, best.)) = '11';
    quit;
``` unPUT transforms this query as follows:

select s as DIR_1 from db.t1 where x=11;

EXAMPLE 7

This example shows a more complex transformation involving user-defined formats and inequalities. Two issues make solving this problem more difficult. The first issue is that the put( ) function is nested within another function, that is not an upcase( ) or strip( ), and could be arbitrarily deep. The second issue is the use of inequalities which often involve a greater number of possible values.

A different technique is used when processing put( ) functions containing user-defined formats with these complex expressions. More specifically, the method commences like Example 5. More specifically, a look up of the user-defined format definition is done to obtain the list of valid format labels, and the valid value(s) for each label. Since there are no user-supplied labels, what makes this technique different is that the invention builds the expression by "walking" the list of labels in the user-defined format and calls a callback routine; supplying a context handle to that portion of the SQL tree. The callback routine then substitutes the label for the variable "color" (as a constant) to form a constant sub-expression, and then calls an expression evaluator to determine whether the sub-expression is true or false. If true, the value for the label is included in the final optimization. If false, it is not included. Consider the following:

```
proc format;
    value nudfmt 0='RED'
        1='REDHEAD'
        2='NOTRED'
        3='GREEN'
        other='BLACK';
    run;
proc sql;
    select * from db.color_tbl
        where (index(put(color, nudfmt.), "RED") > 0);
    quit;
```

During processing, this process iterates over the list of format labels for "nudfmt," and calls the call back routine for each label. The call back routine, given the expression context for (index(put(color, nudfmt.), "RED")>0), will substitute the label in for "color" to form this sub-expression, (index (put('RED', nudfmt.), "RED")>0), which can be evaluated as true or false by the expression evaluator. In this case, the sub-expression is true, so the value for 'Red' (which is 0) will be included in the final expression. This process is repeated for each of the labels in the list of format labels to find that the list of possible values for this expression is (0, 1, 2). So this system generates the following query transformation.

```
Proc sql;
    select * from db.color_tbl
        where color IN(0,1,2);
```

This example illustrates the necessity of using the OTHER=clause. To make mathematically sound expressions, the system has available the full range of possible outcomes for a user-defined format. Without OTHER=, the result of a call to the PUT function for a column value that does not match is a character string of that value (whether the input column is numeric or character). That is, put(color, nudfmt.) for color=5 is the character string '5'. It is noted that this is a SAS language specific rule. In accordance with the invention, the label 'BLACK' is substituted into the subexpression
    (index(put('BLACK', nudfmt.), "RED")>0)

In this case the result is false, so any value that does not match one (or more) of the user-defined format labels is false and will not be included in the final expression. On the other hand, consider a user-defined format defined as follows:

```
proc format;
    value nudfmt 0='RED'
        1='REDHEAD'
        2='NOTRED'
        3='GREEN'
        other='DARKRED';
    run;
```

When the system processes the label 'DARKRED' in this sub-expression (index(put('DARKRED', nudfmt.), "RED")> 0), it evaluates it to be true, causing any non-matching format label to be included in the final result as follows:

```
Proc sql;
    select * from db.color_tbl
        where (( color = 0 ) OR ( color = 1 ) OR ( color = 2 ) OR
        (NOT( color = 0 ) AND
         NOT( color = 1 ) AND
         NOT( color = 2 ) AND
         NOT( color = 3)));
```

This technique allows many types of expressions involving put( ) like functions to be transformed.

Figure 11:
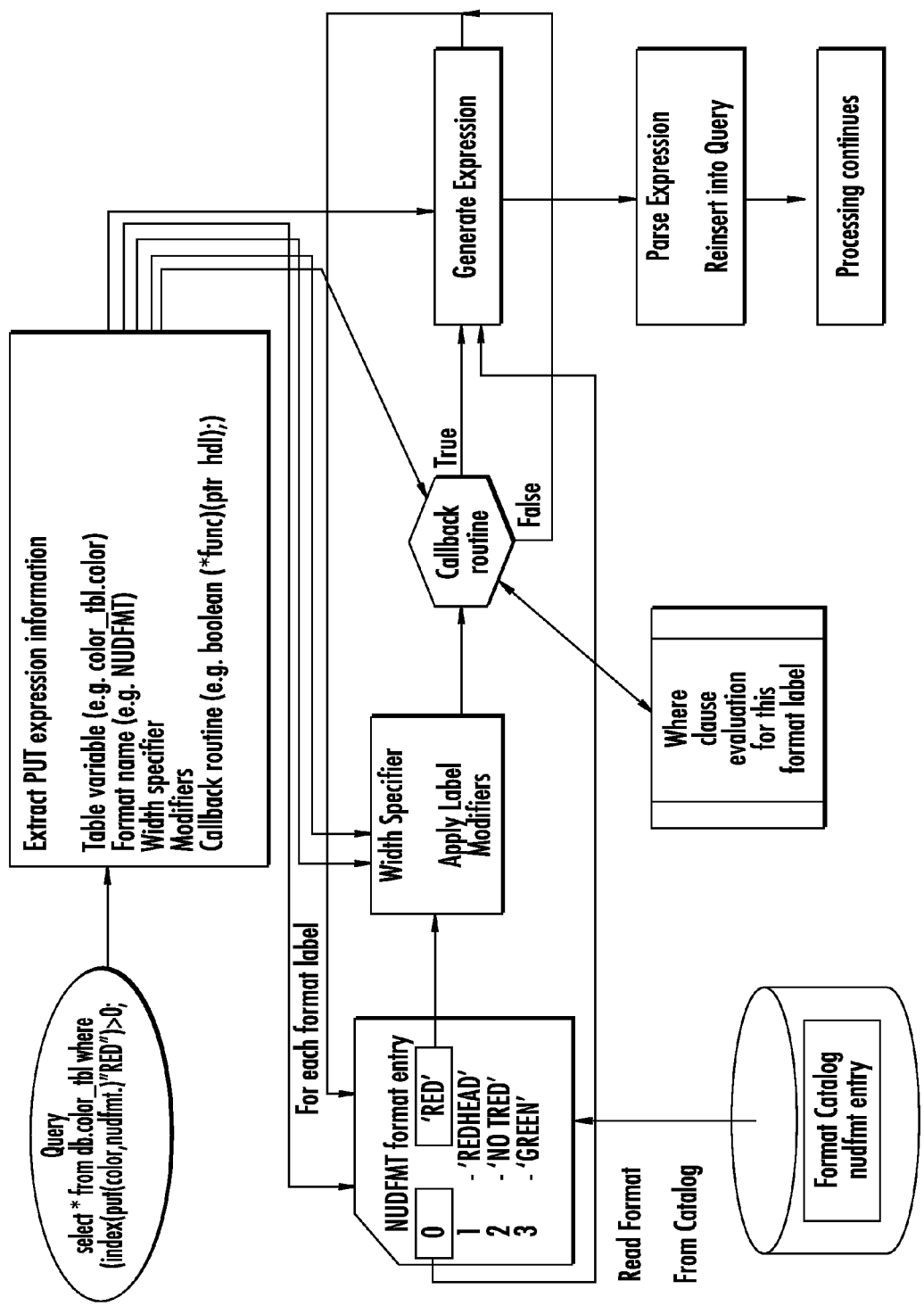
FIG. 11 illustrates a transformation of a query in accordance with Example 7 described herein.

The above example is further illustrated by the diagram of FIG. 11.

EXAMPLE 8

Figure 12:
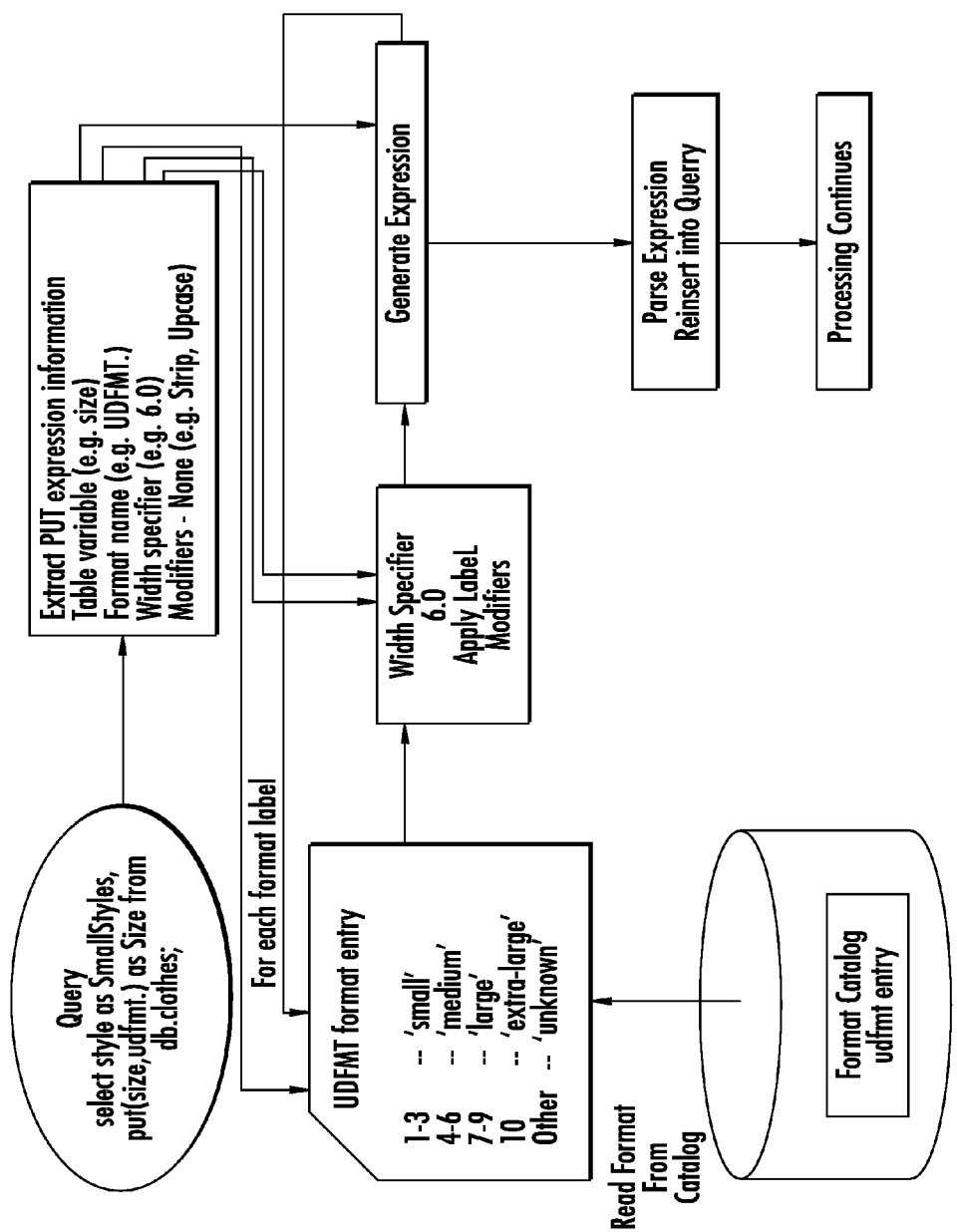
FIG. 12 illustrates a transformation of a query in accordance with Example 8 described herein; and, FIG. 13 illustrates a transformation of a query in accordance with Examples 9 and 10 described herein.

Returning formatted data is very popular for client applications that query data to populate tables and graphs in reports. The unPUT technology can be used to optimize queries that contain put( ) functions anywhere in the SQL query where the put( ) function is allowed (e.g SELECT, ON, ORDER BY and GROUP BY clauses as well as the WHERE and HAVING clauses). The following example as illustrated by FIG. 12, and as set forth hereafter, describes the use of a put( ) function in the SELECT clause to return formatted values for a user-defined format.

```
proc format;
    value udfmt 1-3='small'
```

```
            4-6='medium'
            7-9='large'
            10='extra-large'
            other='unknown';
    run;
    proc sql;
        select style as SmallStyles,
            put(size, udfmt.) as Size
        from db.clothes;
    quit;
```

As written, the query cannot be sent to the database because of the put( ) function in the SELECT clause. However, as implemented in the Proc SQL procedure in accordance with the invention, the put( ) function is recognized by referencing a user-defined format. A lookup of the user-defined format definition of the udfmt format is performed to find the allowed values, similar to what is done in Example 1. As the allowed format values are read, a SQL CASE expression is generated in place of the put( ) function. The WHEN condition is an expression that defines the range of supported values, (e.g. 1-3) for a given format label. The format label, (e.g. 'small'), is used in the THEN result clause. There is a corresponding WHEN/THEN sub-expression generated for each format value range and format label pair in the user-defined format. The PROC FORMAT OTHER=clause becomes the default value used in the ELSE clause.

The optimized query as shown hereafter illustrates the put ( ) function having been replaced with a CASE statement. As a result, it is now possible to pass it to the database.

```
    select style as SmallStyles,
        CASE
            WHEN (1<=size and size <=3) THEN 'small'
            WHEN (4<=size and size <=6) THEN 'medium'
            WHEN (7<=size and size <=9) THEN 'large'
            WHEN (size=10) THEN 'extra-large'
            ELSE 'unknown'
            END as Size
    from db.clothes;
```

It is important to appreciate that the unPUT technology works with either character or numeric format values.

EXAMPLE 9

Changing a column's width, to either widen or narrow a column in the SELECT clause, is a common operation. To narrow a column means the length of the resulting column data is shorter than its input data. To widen a column means the resulting column character length is longer than the original length, with the additional characters padded with blanks (spaces). This example illustrates with reference to FIG. 13 where Proc SQL uses a put( ) function to widen the resulting character column (SmallStyles) from its original length to 32 characters.

select put(style, $32.) as SmallStyles from db.clothes;

Because of the put( ) function, there is again presented a situation where the query will not be passed to the database. However, using the SQL CAST syntax, the put( ) function can be rewritten to an alternate syntax that can be passed to the database. In accordance with the invention the put( ) with the character format specification ($#.) is recognized, and replaced with the following alternate syntax.

cast(style as char(32)) as SmallStyles

This transformation can be made for put( ) functions with a character format anyplace in the SQL query where a put( ) function is allowed (e.g. SELECT, WHERE, ON, HAVING, GROUP BY, or ORDER BY clauses).

EXAMPLE 10

Figure 13:
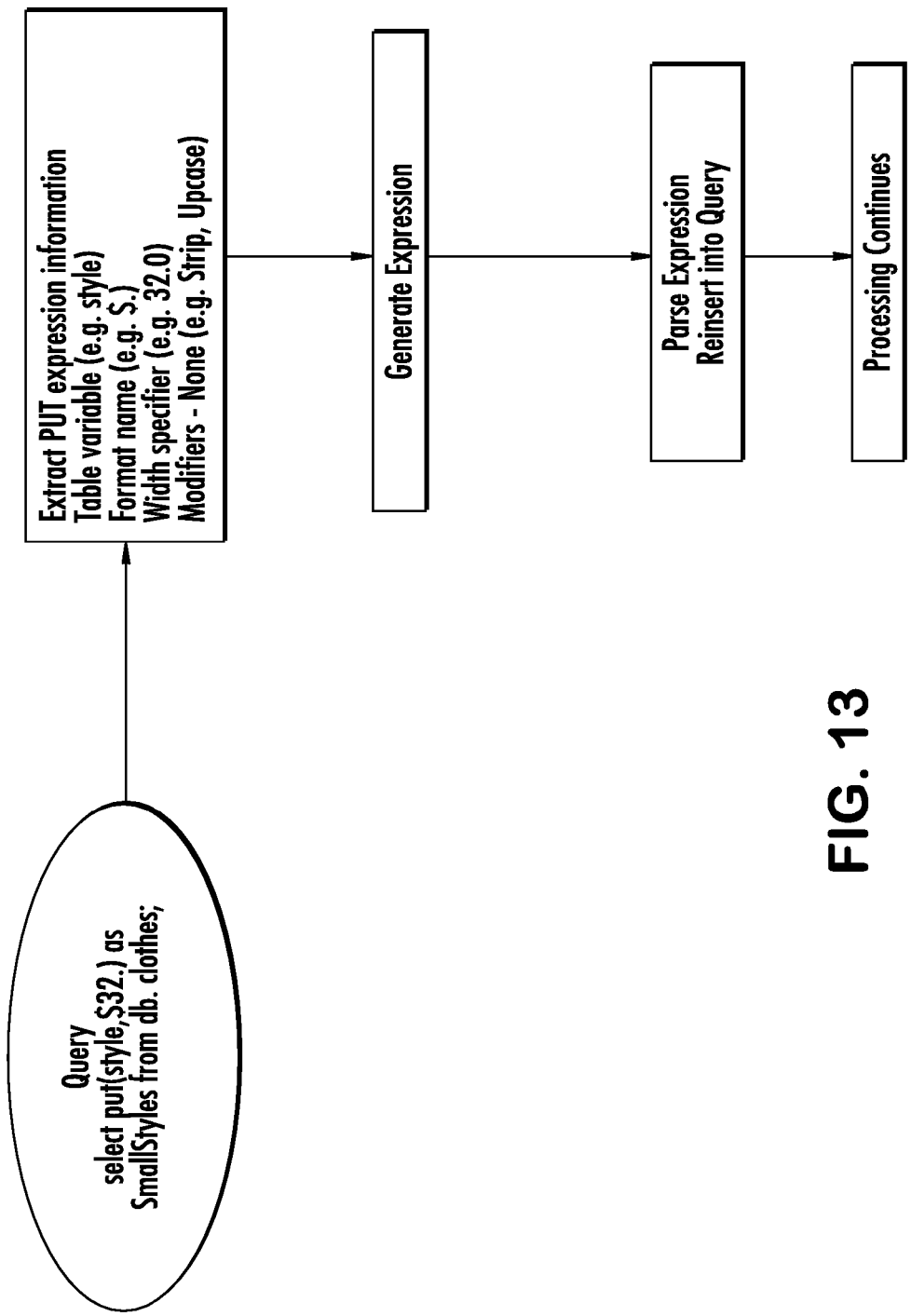

As also illustrated in FIG. 13, when used with numeric data, the put( ) function can be used to implicitly convert its result from a numeric to a character data type while applying the format. A common use of this by client applications is to convert numbers into characters for display in tables and graphs. Using the Proc SQL procedure, the following query demonstrates how to convert a clothing size column from a numeric data type to a character data type of width three. In this query, the resulting column, SmallStyles, will have a character data type of width three.

select put(size, 3.) as SmallStyles from db.clothes;

Once again, because of the put( ) function, the query cannot pass to the database. Using the same algorithm as in prior Example 9, the put( ) function with the numeric format (e.g. w. format) is recognized, and transformed to the following alternate syntax.

cast(size as char(3)) as SmallStyles

In the context of these examples, it is important to recognize that different databases behave differently for the formatting of numeric values, so the syntax and availability of using this transformation can vary by the specific database.

In the same manner the CAST syntax allows conversion from numeric, date, time, or character data types to the same, so put( ) functions that are normally used to perform these operations in Proc SQL can be transformed, using this invention, to utilize a CAST.

As may be appreciated, in accordance with the invention there is provided a method and system in which non-standard data formats can be transformed into standard SQL statements. While specific examples have been given relative to the SAS put( ) function, the invention is not limited to transforming only SAS put( ) functions. Further, the invention allows transformations which have been created by users of a specific 4GL programs.

The invention has been described in part, specifically with reference to a SAS program environment. However, it will be apparent to those of ordinary skill in the art that the methods herein may be applied to other industry standard or proprietary programs generated using a fourth generation language without deviating from the general methods disclosed. Thus, the invention in its broader aspects is therefore not limited to the specific details, representative devices and methods, as shown and described. Accordingly, departures may be made from such details without departing from the spirit or scope of applicants' general inventive concept.

Moreover, while examples have been used to disclose the invention, including the best mode, and also to enable any person skilled in the art to make and use the invention, the patentable scope of the invention is defined by claims, and may include other examples that occur to those skilled in the art. Accordingly, the examples disclosed herein are to be considered non-limiting.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data may be stored and implemented in one or more different types of computer-implemented ways, such as different types of data stores (e.g., storage devices, RAM, ROM, Flash memory, flat files, databases, programming data structures, programming variables, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A computer-implemented method for processing a query, comprising:
    receiving a native syntax query requesting data stored in a non-native database that uses a non-native syntax, wherein the query is received at an application that is separate from the non-native database, wherein the query requests that the data be retrieved from the non-native database, wherein the query requests that a processing operation be performed on the requested data by the application, wherein the query includes one or more expressions, and wherein one or more of the expressions includes one or more functions;
    parsing the native syntax query, wherein parsing includes identifying a function within an expression that cannot be processed by the non-native database, wherein the function specifies the processing operation to be performed on the requested data by the application, wherein a plurality of labels are associated with the function and the expression, and wherein labels include constant labels and format labels;
    analyzing the function and the expression to determine a context of the function within the expression, wherein the context describes how the function is used within the expression;
    generating, using one or more data processors, a final expression query by obtaining a control string from an internal table for each of the plurality of labels associated with the function and the expression, wherein label modifiers are applied to format labels;
    transforming the native syntax query into an equivalent non-native syntax query, wherein transforming includes parsing and inserting the final expression query into the equivalent non-native syntax query using the function, the expression, and the context to translate the function and the expression into multiple functions and multiple expressions that are configured for processing by a non-native database system;
    transmitting the equivalent non-native syntax query to a non-native database system to generate results and to perform the processing operation on the generated results;
    receiving processed results from the non-native database system; and
    transmitting the processed results to a client application.

2. The method of claim 1, wherein the native syntax query is generated by the client application, and wherein the client application is a native system application.

3. The method of claim 2, wherein the application is a non-Structured Query Language (SQL) application, and wherein the non-native syntax is an SQL query syntax.

4. The method of claim 3, wherein the function and expression are not recognized by the SQL query syntax.

5. The method of claim 1, wherein the equivalent non-native syntax query is generated in an iterative manner using a list of formats.

6. The method of claim 1, wherein the internal table maps native syntax to non-native syntax.

7. The method of claim 1, wherein the native syntax and the non-native syntax are each associated with a different fourth generation language.

8. The method of claim 1, wherein generating the final expression query includes using metadata that describes how character or numeric data is transformed.

9. The method of claim 1, wherein generating the final expression query includes referencing a lookup table to determine one or more allowed values in the non-native syntax.

10. The method of claim 1, wherein the native syntax is pre-defined.

11. The method of claim 1, wherein generating the final expression query includes transforming numeric data into character data.

12. The method of claim 1, wherein generating the final expression query is based upon structure of data in the non-native database.

13. The method of claim 12, wherein generating the final expression query is based upon a data type of a field in the non-native database.

14. The method of claim 1, wherein an argument in the function or the expression is in a form unrecognized by the non-native syntax, and wherein the argument is translated without using a pre-defined list of substitute values.

15. The method of claim 1, wherein generating the final expression query includes transforming an upper case string to a numeric value.

16. The method of claim 1, wherein generating the final expression query includes transforming a stripped or trimmed string into a numeric value.

17. The method of claim 1, wherein generating the final expression query includes dividing the function and the expression into subexpressions, wherein each subexpression is transformed based upon a relationship of that subexpression to other subexpressions.

18. The method of claim 1, wherein determining the context of the function within the expression includes considering an argument of the function.

19. A computer implemented system for processing a query, comprising:
one or more physical data processors;
one or more non-transitory computer-readable storage mediums containing instructions configured to cause the one or more processors to perform operations including:
receiving a native syntax query requesting data stored in a non-native database that uses a non-native syntax, wherein the query is received at an application that is separate from the non-native database, wherein the query requests that the data be retrieved from the non-native database, wherein the query requests that a processing operation be performed on the requested data by the application, wherein the query includes one or more expressions, and wherein one or more of the expressions includes one or more functions;
parsing the native syntax query, wherein parsing includes identifying a function within an expression that cannot be processed by the non-native database, wherein the function specifies the processing operation to be performed on the requested data by the application, wherein a plurality of labels are associated with the function and the expression, and wherein labels include constant labels and format labels;
analyzing the function and the expression to determine a context of the function within the expression, wherein the context describes how the function is used within the expression;
generating a final expression query by obtaining a control string from an internal table for each of the plurality of labels associated with the function and the expression, wherein label modifiers are applied to format labels;
transforming the native syntax query into an equivalent non-native syntax query, wherein transforming includes parsing and inserting the final expression query into the equivalent non-native syntax query using the function, the expression, and the context to translate the function and the expression into multiple functions and multiple expressions that are configured for processing by a non-native database system;
transmitting the equivalent non-native syntax query to a non-native database system to generate results and to perform the processing operation on the generated results;
receiving processed results from a non-native database system; and
transmitting the processed results to a client application.

20. The system of claim 19, wherein the native syntax query is generated by the client application, and wherein the client application is a native system application.

21. The system of claim 20, wherein the application is a non-Structured Query Language (SQL) application, and wherein the non-native syntax is an SQL query syntax.

22. The system of claim 21, wherein the function and expression are not recognized by the SQL query syntax.

23. The system of claim 19, wherein the equivalent non-native syntax query is generated in an iterative manner using a list of formats.

24. The system of claim 19, wherein the internal table maps native syntax to non-native syntax.

25. The system of claim 19, wherein the native syntax and the non-native syntax are each associated with a different fourth generation language.

26. The system of claim 19, wherein generating the final expression query includes using metadata that describes how character or numeric data is transformed.

27. The system of claim 19, wherein generating the final expression query includes referencing a lookup table to determine one or more allowed values in the non-native syntax.

28. The system of claim 19, wherein the native syntax is pre-defined.

29. The system of claim 19, wherein generating the final expression query includes transforming numeric data into character data.

30. The system of claim 19, wherein generating the final expression query is based upon structure of data in the non-native database.

31. The system of claim 30, wherein generating the final expression query is based upon a data type of a field in the non-native database.

32. The system of claim 19, wherein an argument in the function or the expression is in a form unrecognized by the non-native syntax, and wherein the argument is translated without using a pre-defined list of substitute values.

33. The system of claim 19, wherein generating the final expression query includes transforming an upper case string to a numeric value.

34. The system of claim 19, wherein generating the final expression query includes transforming a stripped or trimmed string into a numeric value.

35. The system of claim 19, wherein generating the final expression query includes dividing the function and the expression into subexpressions, wherein each subexpression is transformed based upon a relationship of that subexpression to other subexpressions.

36. The system of claim 19, wherein determining the context of the function within the expression includes considering an argument of the function.

37. A computer-program product for processing a query, tangibly embodied in a machine-readable non-transitory storage medium, including instructions configured to cause a data processing apparatus to:
receive a native syntax query requesting data stored in a non-native database that uses a non-native syntax, wherein the query is received at an application that is separate from the non-native database, wherein the query requests that the data be retrieved from the non-native database, wherein the query requests that a processing operation be performed on the requested data by the application, wherein the query includes one or more expressions, and wherein one or more of the expressions includes one or more functions;
parse the native syntax query, wherein parsing includes identifying a function within an expression that cannot be processed by the non-native database, wherein the function specifies the processing operation to be performed on the requested data by the application, wherein a plurality of labels are associated with the function and the expression, and wherein labels include constant labels and format labels;
analyze the function and the expression to determine a context of the function within the expression, wherein the context describes how the function is used within the expression;

generate a final expression query by obtaining a control string from an internal table for each of the plurality of labels associated with the function and the expression, wherein label modifiers are applied to format labels;

transform the native syntax query into an equivalent non-native syntax query, wherein transforming includes parsing and inserting the final expression query into the equivalent non-native syntax query using the function, the expression, and the context to translate the function and the expression into multiple functions and multiple expressions that are configured for processing by a non-native database system;

transmit the equivalent non-native syntax query to a non-native database system to generate results and to perform the processing operation on the generated results;

receive processed results from the non-native database system; and transmit the processed results to a client application.

38. The computer-program product of claim 37, wherein the native syntax query is generated by the client application, and wherein the client application is a native system application.

39. The computer-program product of claim 38, wherein the application is a non-Structured Query Language (SQL) application, and wherein the non-native syntax is an SQL query syntax.

40. The computer-program product of claim 39, wherein the function and expression are not recognized by the SQL query syntax.

41. The computer-program product of claim 37, wherein the equivalent non-native syntax query is generated in an iterative manner using a list of formats.

42. The computer-program product of claim 37, wherein the internal table maps native syntax to non-native syntax.

43. The computer-program product of claim 37, wherein the native syntax and the non-native syntax are each associated with a different fourth generation language.

44. The computer-program product of claim 37, wherein generating the final expression query includes using metadata that describes how character or numeric data is transformed.

45. The computer-program product of claim 37, wherein generating the final expression query includes referencing a lookup table to determine one or more allowed values in the non-native syntax.

46. The computer-program product of claim 37, wherein the native syntax is pre-defined.

47. The computer-program product of claim 37, wherein generating the final expression query includes transforming numeric data into character data.

48. The computer-program product of claim 37, wherein generating the final expression query is based upon structure of data in the non-native database.

49. The computer-program product of claim 48, wherein generating the final expression query is based upon a data type of a field in the non-native database.

50. The computer-program product of claim 37, wherein an argument in the function or the expression is in a form unrecognized by the non-native syntax, and wherein the argument is translated without using a pre-defined list of substitute values.

51. The computer-program product of claim 37, wherein generating the final expression query includes transforming an upper case string to a numeric value.

52. The computer-program product of claim 37, wherein generating the final expression query includes transforming a stripped or trimmed string into a numeric value.

53. The computer-program product of claim 37, wherein generating the final expression query includes dividing the function and the expression into subexpressions, wherein each subexpression is transformed based upon a relationship of that subexpression to other subexpressions.

54. The computer-program product of claim 37, wherein determining the context of the function within the expression includes considering an argument of the function.

* * * * *